(12) United States Patent
Xiao et al.

(10) Patent No.: US 8,471,524 B2
(45) Date of Patent: Jun. 25, 2013

(54) BATTERY CHARGING DEVICE AND METHOD FOR CONTROLLING CHARGING THEREOF

(75) Inventors: Lirong Xiao, Zhuhai (CN); Shenyuan Li, Zhuhai (CN)

(73) Assignee: Actions Semiconductor Co. Ltd., Zhuhai (CN)

( * ) Notice: Subject to any disclaimer, the term of this patent is extended or adjusted under 35 U.S.C. 154(b) by 383 days.

(21) Appl. No.: 12/990,140

(22) PCT Filed: Jan. 22, 2009

(86) PCT No.: PCT/CN2009/070262
§ 371 (c)(1),
(2), (4) Date: Oct. 28, 2010

(87) PCT Pub. No.: WO2009/137995
PCT Pub. Date: Nov. 19, 2009

(65) Prior Publication Data
US 2011/0050163 A1    Mar. 3, 2011

(30) Foreign Application Priority Data
Apr. 28, 2008   (CN) .......................... 2008 1 0066926

(51) Int. Cl.
*H01M 10/46* (2006.01)
(52) U.S. Cl.
USPC ........................................................ 320/107
(58) Field of Classification Search
USPC ............................ 320/107, 114, 115, 128, 135
See application file for complete search history.

(56) References Cited

U.S. PATENT DOCUMENTS

| 5,710,501 A * | 1/1998 | van Phuoc et al. ............. 307/150 |
| 6,424,123 B1 * | 7/2002 | Odaohhara et al. ............ 320/134 |
| 7,446,549 B2 * | 11/2008 | Tomita et al. ............... 324/750.3 |
| 2002/0060554 A1 * | 5/2002 | Odaohhara et al. ............ 320/134 |
| 2003/0044689 A1 * | 3/2003 | Miyazaki et al. .............. 429/320 |

FOREIGN PATENT DOCUMENTS

| CN | 1761122 | | 4/2006 |
| CN | 2794011 | | 7/2006 |
| CN | 101282045 | | 10/2008 |
| GB | 2219151 | * | 4/1989 |
| GB | 2219151 | | 11/1989 |

* cited by examiner

*Primary Examiner* — Edward Tso
(74) *Attorney, Agent, or Firm* — Hamre, Schumann, Mueller & Larson, P.C.

(57) ABSTRACT

The present invention is adapted for the field of power supply and provides a battery charging device and a method for controlling charging thereof, including: a charging circuit which has a charging current setting terminal for charging the battery according to charging current of the charging current setting terminal; a charging current control circuit which is connected with the charging current setting terminal and adjusts the charging current gradually according to equivalent resistance in the charging current control circuit; a general register circuit which is connected to the charging current control circuit and to control the equivalent resistance by setting value of a general register. In the present invention, a plurality of switching tubes and resistances are integrated into the charging current control circuit. The switching tubes is switched on or off by setting the value of the general register, thereby adjusting the existing charging current gradually and causing the voltage of the charging power source to descend/ascend smoothly. This provides a solution to the problem of equipment instability caused by the voltage fluctuation in the adjustment process of charging current in the existing technology.

20 Claims, 7 Drawing Sheets

BATTERY CHARGING DEVICE AND METHOD FOR CONTROLLING CHARGING THEREOF

TECHNICAL FIELD

The present invention relates to the field of power supply and, more particularly to a battery charging device and a method for controlling charging thereof.

BACKGROUND

With the development of electronic technology, more and more portable electronic products, such as MP3 players, mobile telephones and digital camera etc., are put into use in the daily life Generally, high end electronic products are supplied by a battery with high energy storing performance. At present, only the charging power source which matches the corresponding portable device or possesses higher load capacity and better load fluctuation features can be used due to the fact that different power sources, e.g., universal serial bus USB power source or transformer etc., own different load capacities and load fluctuation features.

In an existing technology 1, an approach of constant current-constant voltage is used to charge the battery. Namely, a constant charging current is used for charging the battery when the voltage of battery is lower than 4.2V. This process is called the phase of constant current. The charging power source outputs 4.2V constant voltage when the voltage of battery is equal to 4.2V. At the same time, the charging current decreases gradually due to the battery features. This process is called the phase of constant voltage. In the phase of constant current, the charging current keeps unchanged. For the same portable electronic product, however, the unchanged charging current will not vary with the load capacity of the charging power source, so the charging power source with a load capacity lower than the charging current will be unable to charge the battery and the charging power source with a load capacity higher than the charging current can not be effectively utilized. Meanwhile, during the instantaneous increase of the current, the voltage of the charging power source also falls. When the load transient response feature of the charging power source is weak, namely, the voltage of the charging power source falls too much with the change of current, even lower than the voltage of battery, it will make the charging failure.

Figure 1:
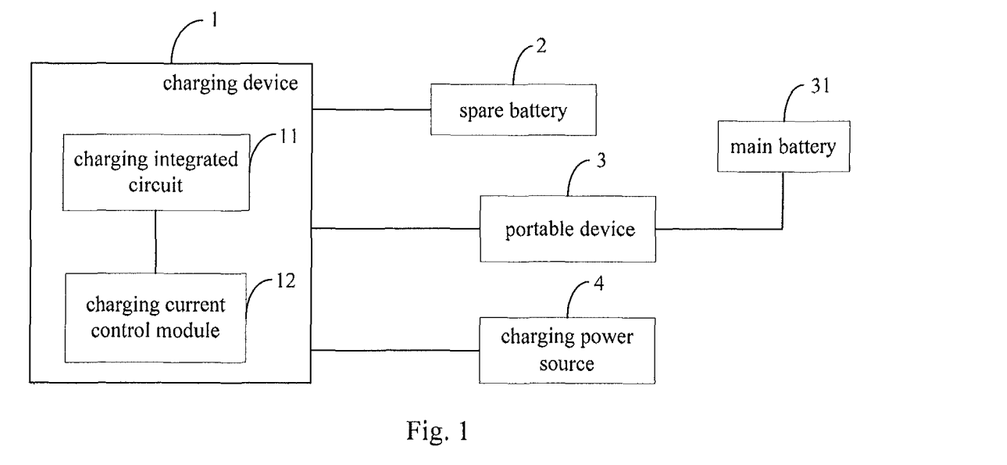
FIG. 1 is a diagram of logical structure among a charging device capable of adjusting charging current, a battery and a charging power source in accordance with an existing technology.
Figure 2:
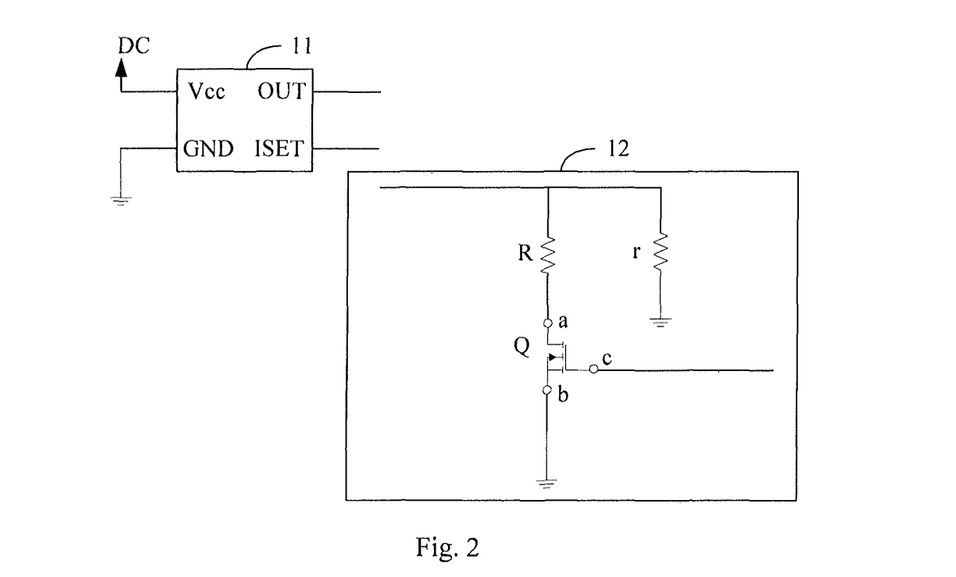
FIG. 2 is a circuit diagram of the charging device capable of adjusting charging current in accordance with the existing technology.

In another existing technology 2, a charging device, which can adjust the charging current, is used for charging the battery. FIG. 1 shows a logical structure among the charging device, a battery and the charging power source, including: a charging device 1, a spare battery 2, a portable device 3 and a charging power source 4. Among them, a main battery 31 is integrated into the portable device 3. The charging device 1 comprises: a charging integrated circuit 11 for setting the charging current for a spare battery 2 through the resistance; a charging current control module 12 for controlling the resistance to adjust the charging current which the charging integrated circuit 11 provides for the spare battery 2. FIG. 2 shows the charging integrated circuit 11 and a circuit of the charging current control module 12. The charging integrated circuit 11 possesses a current setting terminal ISET, while the charging current control module 12 includes a switching tube Q and two resistances R and r. A terminal b (source/drain electrode) of the switching tube Q is grounded, a terminal a (source/drain electrode) is connected to the current setting terminal ISET of the charging integrated circuit via the resistance R, and a terminal c (grid electrode) is connected to the portable device, for receiving the setting signal of charging current. One terminal of the resistance r is grounded while the other terminal, together with one terminal of resistances R, is connected to the current setting terminal of the charging integrated circuit.

The charging method adopted for the existing technology 2 is that: the charging power source charges the spare battery 2 with a relatively great current through the charging device 1, and then determines whether the portable device 3 is connected with the charging device for charging. When the portable device 3 is connected with the charging device 1 and charged, a charging current setting signal is transmitted to the charging current control module 12 which changes its resistance value according to the charging current setting signal. Finally, the charging integrated circuit 11 lowers the charging current for the spare battery 2 according to the resistance value in the charging current control module 12.

If the charging device provided in the existing technology 2, which can adjust the charging current, is used for charging the battery, it can solve some disadvantages in the existing technology 1 but fail to adjust the charging current to the maximum load capacity of the charging power source. Meanwhile, a great voltage fluctuation will occur on the terminal of the charging power source at the instant that the charging of the spare battery is started for the first time, the portable device is connected suddenly or the charging current of the spare battery is lowered. That is to say, the voltage of the charging power source fluctuates and the fluctuation will cause the instability of the whole device. The voltage fluctuation will also occur in the course of the adjustment of the charging current.

SUMMARY

An object of an embodiment of the present invention is to provide a battery charging device and a controlling method thereof, in order to solve instability problem of the whole device caused by the voltage fluctuation in the course of the adjustment of the charging current in the existing technology.

The embodiment of the present invention is that: a battery charging device, the device comprises:

a charging circuit having a charging current setting terminal for charging the battery according to a value of charging current of the charging current setting terminal;

a charging current control circuit connected with the charging current setting terminal for adjusting the value of charging current gradually according to value of equivalent resistance of the charging current control circuit;

a general register circuit connected with the charging current control circuit and for adjusting the value of equivalent resistance by setting the values of general registers.

Another object of the embodiment of the present invention is to provide a method for controlling charging of battery, which is adapted for the above battery charging device, comprises the following step:

adjusting a value of the charging current gradually by setting value of the general register when connection of the charging power source is detected.

Still another object of the embodiment of the invention is to provide a battery charging control system, the system comprising:

a current adjusting module for adjusting a value of the charging current by setting value of the general register when connection of the charging power source is detected.

In the embodiment of the present invention, a plurality of switching tubes and resistances are integrated into the charging current control circuit. The switching tubes is switched on or off by setting the value of the general register, thereby adjusting the immediate charging current gradually and causing the voltage of the charging power source to descend/ascend smoothly. This provides a solution to the problem of equipment instability caused by the voltage fluctuation in the adjustment process of charging current in the existing technology.

DETAILED DESCRIPTION OF THE EMBODIMENTS

In order to make clearer the objects, technical solutions and advantages of the invention, the present invention will be explained below in detail with reference to the accompanying drawings and embodiments. It is to be understood that the following description of the embodiments is merely to explain the present invention and is no way intended to limit the invention.

In an embodiment of the present invention, a plurality of switching tubes and resistances are integrated into a charging current control circuit. The switching tubes is switched on or off by setting the value of general registers, thereby the immediate charging current adjusted gradually and the voltage of the charging power source descending/ascending smoothly. This provides a solution to the problem of equipment instability caused by the voltage fluctuation in the adjustment process of charging current in the existing technology.

Figure 3:
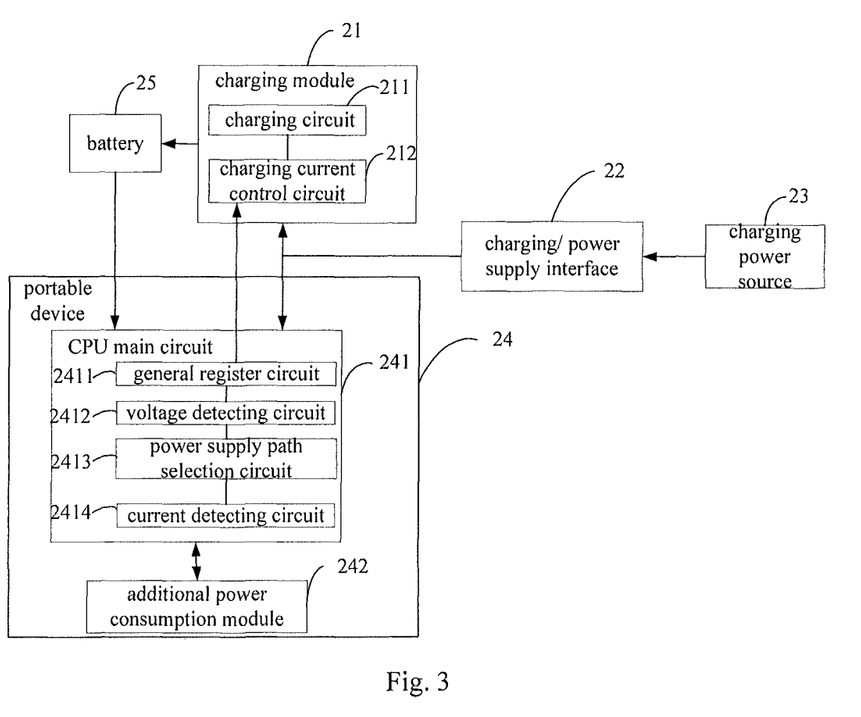
FIG. 3 is a diagram of logical structure among a battery charging device, a portable device and a charging power source in accordance with an embodiment of the present invention.

FIG. 3 shows a logical structure among a battery charging device, a portable device and a charging power source in accordance with an embodiment of the present invention, comprising: a charging module 21, a charging/power supply interface 22, a charging power source 23, a portable device 24 and a battery 25. The external charging power source 23 (universal serial bus USB power source or transformer) is connected to the charging module 21 via the charging/power supply interface 22, thereby charging the battery 25 and providing power for the portable device 24.

The charging module 21 further comprises: a charging circuit 211 and a charging current control circuit 212. The same as the charging integrated circuit 11 adopted in the existing technology 2, the charging circuit 211 possesses a charging current setting terminal for charging the battery according to a value of charging current on the charging current setting terminal. The charging current control circuit 212 is connected to the charging current setting terminal of the charging circuit, for adjusting the charging current according to value of the equivalent resistance thereof.

The charging/power supply interface 22 is connected to the charging module 21, the portable device 24 and the charging power source 23, for receiving and outputting the charging current from the charging power source 23. Wherein, the charging/power supply interface is compatible with USB line in accordance with the international standard.

The portable device 24 includes a CPU main circuit 241 and additional power consumption module 242. The CPU main circuit 241 further includes: a general register circuit 2411, a voltage detecting circuit 2412, a power supply path selection circuit 2413 and a current detecting circuit 2414. Additional power consumption module 242 are functional devices such as screen, flash and FM radio set modules and so on.

When the charging power source 23 is connected, the charging current via the charging/power supply interface 22 is transmitted to charge the battery 25 through the charging circuit 211 in the charging module 21, thereby a first current path forming. The charging current via the charging/power supply interface 22 reaches additional power consumption module 242 in the portable device under the control of the CPU main circuit 241 in the portable device 24, thereby a second current path forming. When no external charging power source 23 is connected, the battery 25 provides power for additional power consumption module 242 in the portable device under the control of the CPU main circuit 241, thereby a third current path forming. Detection of the charging power source 23, switch control of the charging circuit 211, voltage detection of the battery 25, election of the second or third current paths, and control of power consumption of the additional power consumption module 242 can be achieved by means of the CPU main circuit 241.

In accordance with an embodiment of the present invention, the battery charging device comprises: a charging circuit 211 having a charging current setting terminal for charging the battery according to a value of the charging current on the charging current setting terminal; a charging current control circuit 212, which is connected to the charging current setting terminal, for adjusting the value of charging current according to a value of the equivalent resistance; a general register circuit 2411, which is connected to the charging current control circuit, for controlling the value of equivalent resistance by setting the value of the general register.

Figure 4:
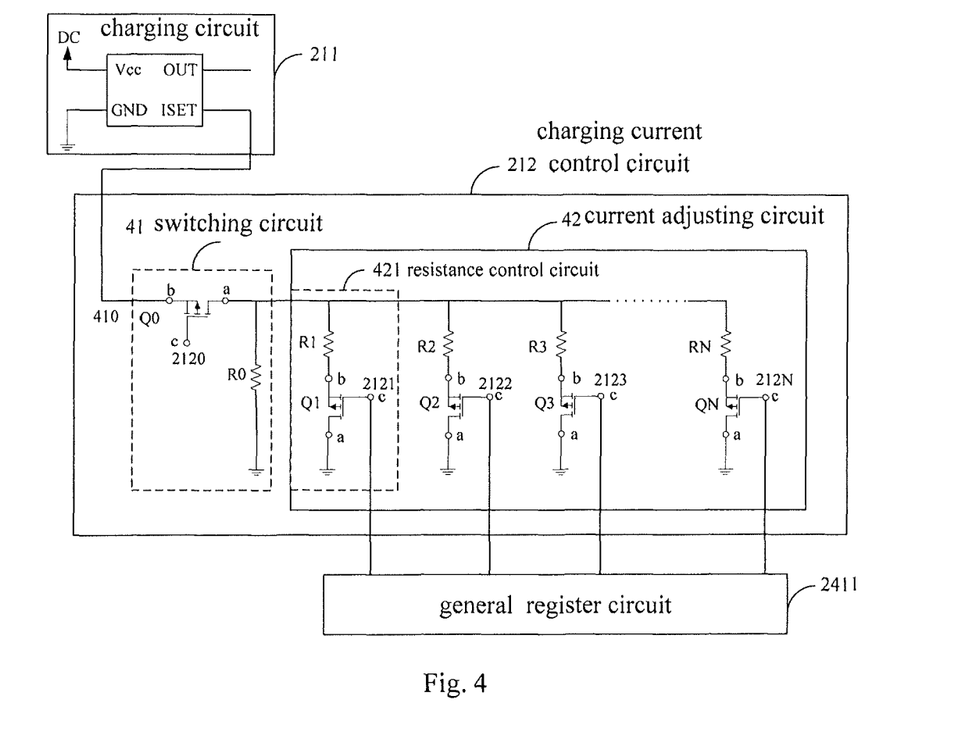
FIG. 4 is a circuit diagram of the battery charging device in accordance with an embodiment of the present invention.

In an embodiment of the present invention, a circuit structure of a battery charging device is shown in FIG. 4. For the sake of description, only the parts relevant to the present invention are shown. The specific details are described below:

The charging current control circuit 212 further includes a switching circuit 41 and a current adjusting circuit 42.

One terminal 410 of the switching circuit 41 is connected to the charging current setting terminal ISET of the charging circuit 211, for controlling whether to switch on the charging circuit. As an exemplary embodiment of the present invention, the switching circuit 41 includes: a first switching tube Q0 and a first resistance R0. Among them, A first terminal b of the first switching tube is connected to the charging current setting terminal of the charging circuit, a second terminal a of the first switching tube is grounded via the first resistance R0, and a control terminal c of the first switching tube is connected with a portable electronic device, for controlling whether to switch on the charging circuit. It is to be noted that the first terminal b and the second terminal a of the first switching tube Q0 may be either a source or drain electrode. The second terminal a is a drain electrode while the first terminal b is a source electrode. The first terminal b is a drain electrode while the second terminal a is a source electrode. The control terminal c is a grid electrode.

The current adjusting circuit 42 is connected to the switching circuit 41, for adjusting the value of charging current in the charging circuit. As an exemplary embodiment of the present invention, the current adjusting circuit 42 includes: N cascade-connected resistance control circuits 421. N is a positive integer equal to or more than 2. A resistance control circuit 421 further comprises: a second switching tube Q1 and a second resistance R1. The first terminal b of the second switching tube Q1 is connected to the switching circuit 41 via the second resistance R1, the second terminal a of the second switching tube Q1 is grounded, and the control terminal c of the second switching tube Q1 is connected to the interface terminal of the general register circuit. It is to be noted that the first terminal b and second terminal a of the second switching tube Q1 may be either a source or drain electrode. The second terminal a is a drain electrode while the first terminal b is a source electrode. The first terminal b is a drain electrode while the second terminal a is a source electrode. The control terminal c is a grid electrode. Ports 2120, 2121, 2122, 2123 to 212N of control terminal c are connected to the interfaces of the general register in the portable device. The programmer can set the values of the general register to control these ports as high or low electrical level by programming, to control the first and second switching tubes to be on or off, thereby to control the equivalent resistance as well as the value of the charging current to the battery. That is to say, the programmer can adjust the value of the charging current by setting the values of the general register. The value of N is set in accordance with the capacity of the battery. In an embodiment of the present invention, the charging current control circuit 212 divides the value of the charging current into a plurality of levels. Generally, the capacity of the battery for the portable device is about 1000 mAh, so it is feasible to define N=20 and to set the current interval value between adjacent charging current levels as 50 mA according to the values of R1 to RN. Likely, it is also feasible to define N=10 and to set the current interval value between the adjacent charging current levels as 100 mA according to the values of R1 to RN. It is to be noted that the value of the current interval between the adjacent charging current levels can be set as specific required, and preferably can be defined between 20 mA and 200 mA. If the charging current needs to be adjusted by 100 mA, the current interval value between the adjacent charging current levels could be set as 100 mA, thereby satisfying the need only by adjusting one level. Similarly, if the current interval value between the adjacent charging current levels is set as 20 mA, it can be achieved by adjusting five levels at a time, or otherwise by adjusting one level for five times. Alternatively, it can be achieved by adjusting two, three or four levels by analogy. Thereinafter, the value of current interval between the adjacent charging current levels is set as 50 mA for exemplary description. The charging current between 50 mA and 1000 mA is set by controlling the equivalent resistance, and likely the charging current of 50 mA/1000 mA is set as specific required. The charging current control circuit 212 is controlled through the general register in the CPU, so that the programmer can achieve the function of gradually adjusting the charging current for the battery by setting the value of the general register, accordingly preventing the voltage of the charging power source from instantaneous fluctuation due to sudden change in the current. In an embodiment of the present invention, a portable electronic device provided with the above battery charging device for charging, in which the CPU can automatically judge the load current capacity of the charging power source 23 by means of combination of the voltage detecting circuit 2412 and the charging circuit 211 in the CPU main circuit 241, can adjust the charging current automatically and gradually, enable the voltage of the charging power source 23 to smoothly descend after the charging circuit 211 is switched on, and render the charging power source 23 at the state of maximum load, thereby enabling the portable electronic device to adapt itself to the charging power source 23 with different load fluctuation features or load capacities. That is to say, any charging power source can be used for charging the same portable electronic device at the most short time and highest speed.

Figure 5:
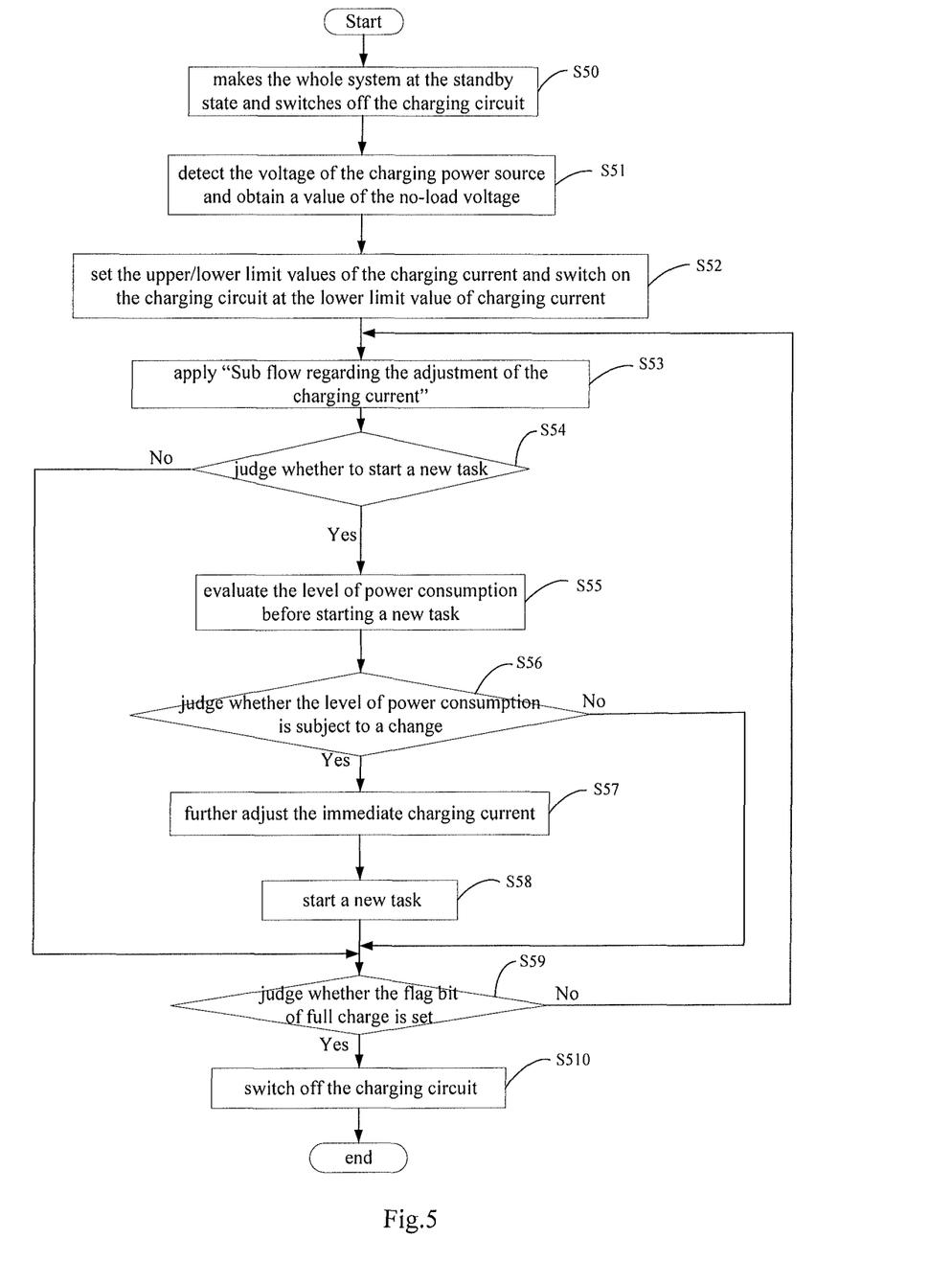
FIG. 5 is an operation flow chart of a method for controlling charging of the battery in accordance with an embodiment of the present invention.

FIG. 5 is an operation flow chart of a method for controlling charging of the battery in accordance with an embodiment of the present invention, which is described below in combination with FIG. 3:

At step S50, the CPU main circuit makes the whole system at the standby state and switches off the charging circuit 211 when detecting the charging/power supply interface 22 is connected to the charging power source 23;

At step S51, detect the voltage of the charging power source 23 by using the voltage detecting circuit 2412 in the CPU main circuit 241, and obtain an approximate value V_NL of the no-load voltage of the charging power source;

At step S52, the upper/lower limit values of the charging current are set according to the features of battery, and the charging circuit 211 is switched on at the lower limit value of charging current and starts to charge the battery 25;

In one embodiment of the present invention, the upper limit value of the charging current is set as the maximum capacity of the battery, and the lower limit value of the charging current is set to be the current interval value between the adjacent charging current levels.

Figure 6:
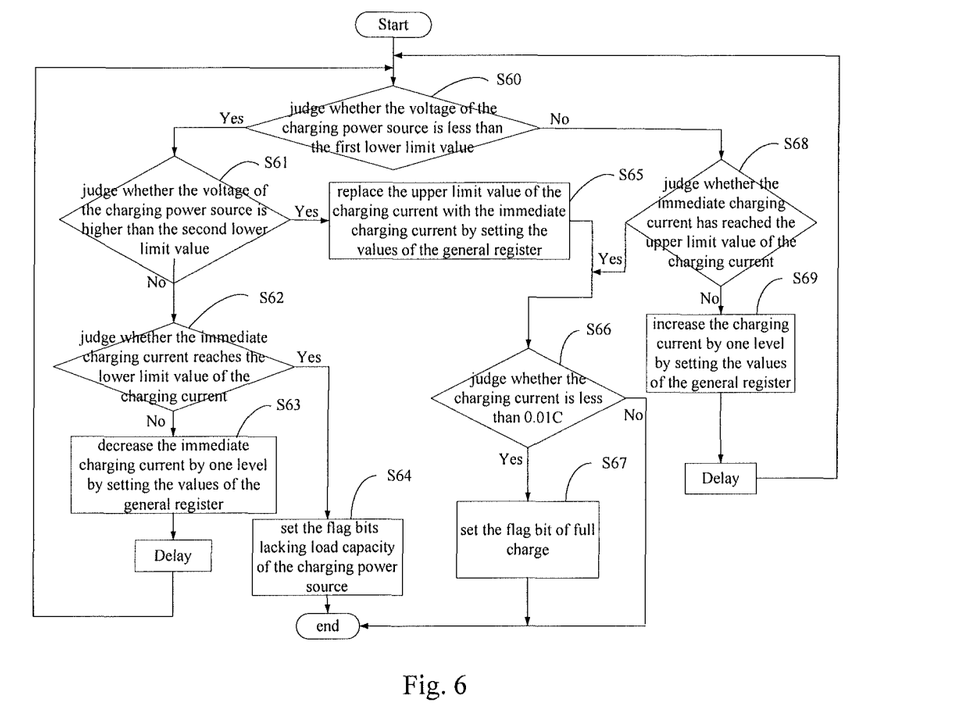
FIG. 6 is a sub flow chart of adjustment of the charging current in accordance with a first embodiment of the present invention.

At step S53, apply "Sub flow of the adjustment of the charging current";

The sub flow of the adjustment of the charging current provided in the first embodiment of the invention is shown in FIG. 6. The load capacity of the charging power source includes a maximum load capacity and a limit load capacity. Among them, the maximum load capacity is the load value when the voltage of the charging power source drops to the a % of the no-load voltage of the charging power source, namely, the first lower limit value is a %×V_NL. The limit load capacity is the load value when the voltage of the charging power source drops to the b % of the no-load voltage of the charging power source, namely, the second lower limit value is a %×V_NL. In the above, b % is less than a %, and the first lower limit value is higher than the second lower limit value.

At step S60, detect the voltage of the charging power source, and judge whether the voltage of the charging power source is less than the first lower limit value a %×V_NL. If so, enter step S61. If not, enter step S68;

At step S61, judge whether the voltage of the charging power source is higher than the second lower limit value b %×V_NL. If so, enter step S65. If not, enter step S62;

At step S62, judge whether the immediate charging current reaches the lower limit value of the charging current. If so, enter step S64. If not, enter step S63;

At step S63, decrease the immediate charging current by one level by setting the values of the general register, and enter step S60;

At step S64, set the flag bits lacking load capacity of the charging power source when the charging current has reached the lower limit value, and exit the sub flow of the adjustment of the charging current;

At step S65, replace the upper limit value of the charging current with the immediate charging current by setting the values of the general register when the voltage of the charging power source exceeds the second limit value;

At step S66, judge whether the charging current is less than 0.01 C (C is the maximum capacity of the battery) through the current detecting circuit 2414 in the CPU main circuit. If so, enter step S67. If not, exit the sub flow of the adjustment of the charging current;

At step S67, exit the sub flow of the adjustment of the charging current after setting the flag bit of full charge when the charging current is less than 0.01 C, namely, it means the battery is fully charged if.

Figure 7:
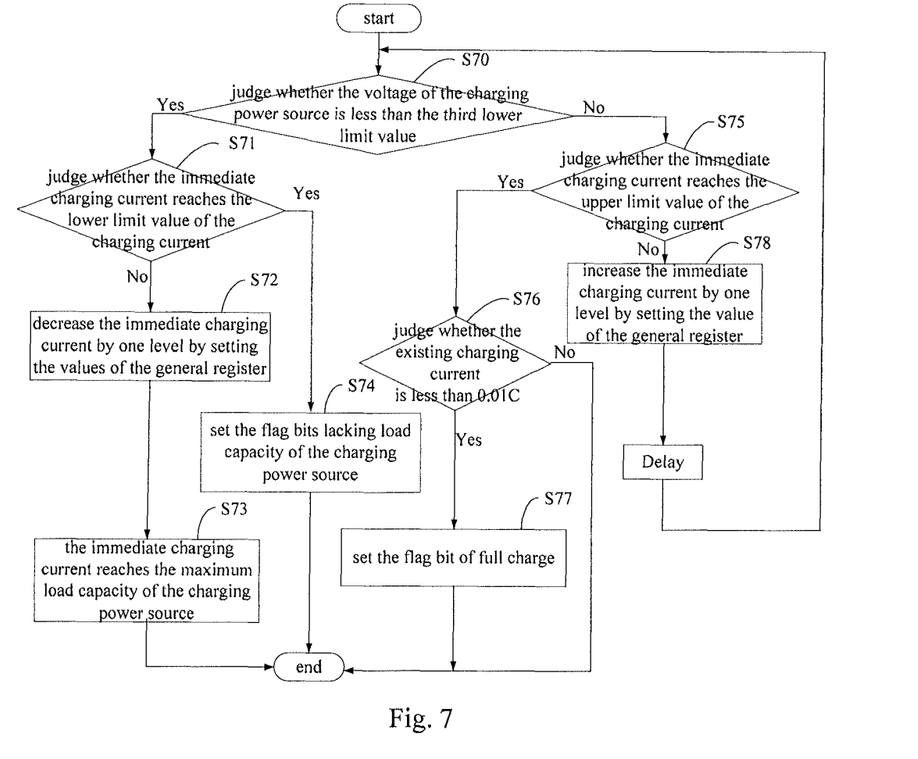
FIG. 7 is a sub flow chart of adjustment of the charging current in accordance with a second embodiment of the present invention.

At step S68, judge whether the immediate charging current has reached the upper limit value of the charging current. If so, enter step S66. If not, enter step S69;

At step S69, increase the charging current by one level by setting the values of the general register, and enter step S60;

The sub flow of the adjustment of the charging current provided in the second embodiment of the present invention is shown in FIG. 7, which is described in detail as follows:

At step S70, detect the voltage of the charging power source 23, and judge whether the voltage of the charging power source is less than the third lower limit value k×V_NL. If so, enter step S71. If not, enter step S75;

At step S71, judge whether the immediate charging current reaches the lower limit value of the charging current. If so, enter step S74. If not, enter step S72;

At step S72, decrease the immediate charging current by one level by setting the values of the general register, and enter step S73;

At step S73, exit the sub flow of the adjustment of the charging current when the immediate charging current reaches the maximum load capacity of the charging power source;

At step S74, switch off the charger, set the flag bits lacking load capacity of the charging power source, and exit the sub flow of the adjustment of the charging current;

At step S75, judge whether the immediate charging current reaches the upper limit value of the charging current. If so, enter step S76. If not, enter step S78;

At step S76, judge whether the immediate charging current is less than 0.01 C (C is the maximum capacity of the battery) by the current detecting circuit 2414 in the CPU main circuit. If so, enter step S77. If not, exit the sub flow of the adjustment of the charging current;

At step S77, exit the sub flow of the adjustment of the charging current after fully charging the battery and setting the flag bit of full charge;

At step S78, increase the immediate charging current by one level by setting the value of the general register, and enter step S70.

In the embodiment of the present invention, the immediate charging current is increased by one level by setting the value of the general register to enable the voltage of the charging power source to drop smoothly, thereby preventing the voltage of the charging power source from instantaneous dropping pulse, until the voltage drops to the scope between the first lower limit value a %×V_NL and the second lower limit value b %×V_NL. The increasing the charging current for the battery is ceased and the corresponding current of the general register is designated to the upper limit value of charging current for the battery by reading out the values of the general register. The upper limit value of charging current is variable depending on the performance of battery and the load capacity of the charging power source.

At step S54, judge whether to start a new task through the CPU main circuit 241, namely, judge whether the power consumption of additional power consumption module 242 in the portable device is subject to a change. If so, enter step S55. If not, enter step S59;

At step S55, evaluate the grade of power consumption through the CPU main circuit 241 before starting a new task. The power consumption of system can be divided into two parts: one part, called static power consumption, is irrelevant to the work frequency of system, such as power consumption for backlight of color screen. The static power consumption can be easily calculated due to less influencing factors; the other part, called dynamic power consumption, is relevant to the work frequency of system. In terms of the portable device, CPU may run multiple tasks, with different tasks for different working states, so the functional modules synchronously applied are also different. In order to figure out the power consumption of system, number the functional modules applied for all tasks working at the same time, record them in the software, and evaluate the power consumption according to the condition of service of these functional modules, and divide it into grades. This method is described in detail as follows:

The adjustment task includes a startup task and an end task. The method for evaluation of dynamic power consumption of system before starting a task is that: firstly, confirm which functional modules in the system will work at the same time after starting the task and figure out which combination of these functional modules working at the same time consumes the most power. Among these co-operative functional modules, the maximum dynamic power consumption of each functional module is in direct proportion to the square of the voltage of the system, and to the frequency and the load capacitance of circuit respectively. The load capacitance is constant once the portable system is designed. If the dynamic power consumption of module i running at the largest power is measured as Di (namely, the power consumption per frequency unit MHz is measured as Di when the voltage of power supply is equal to Utest (i)). If the working frequency of module i is defined as fi and then the power consumption is Di*fi when the voltage of electric source is equal to Utest (i). If the voltage of power supply is Urun (i), the power consumption is $Di*fi*[Urun(i)/Utest(i)]^2$ due to the fact that the power consumption is in direct proportion to the square of the voltage. In this way, the maximum dynamic power consumption of the combination of the functional modules working at the same time, after a task is started, can be obtained. The power consumption of the combination of functional modules working at the same time and consuming the most power is the maximum dynamic power consumption of the system after the task is started. The maximum dynamic power consumption plus the static power consumption is the total power consumption after the task is started. Before the task comes to an end, the method for evaluation of the power consumption of the system is the same as above.

The evaluated power consumption of the system needs to be divided into different levels, and given an allowance of 10% to 20%. For instance, the difference between the power consumption levels is defined as 50 mA. If the evaluated power consumption is 170 mA, it is feasible to divide it into 200 mA level. If the evaluated power consumption is 200 mA, divide it into 250 mA level.

At step S56, judge whether the level of power consumption is subject to a change. If so, enter step S57. If not, enter step S59;

At step S57, further adjust the immediate charging current in accordance with the level of power consumption of new task until it meets the needs;

As one embodiment of the present invention, the immediate charging current is decreased by n levels when the level of power consumption is increased by n levels. The immediate charging current is increased by n levels when the level of power consumption is decreased by n levels. For instance, if the level of power consumption needs to be decreased by 2 levels (50 mA*2), the charging current has to increase by 2 levels in the way of 50 mA/level, preventing the voltage of the charging power source from instantaneous fluctuation due to the sudden change in the current, and enabling the voltage of the charging power source to descend/ascend smoothly;

At step S58, start new tasks, such as playing music, tuning in the radio set, and browsing photos etc;

At step S59, judge whether the flag bit of full charge is set. If so, enter step S510. If not, return to step S53;

At step S510, switch off the charging circuit, and come to an end.

Figure 8:
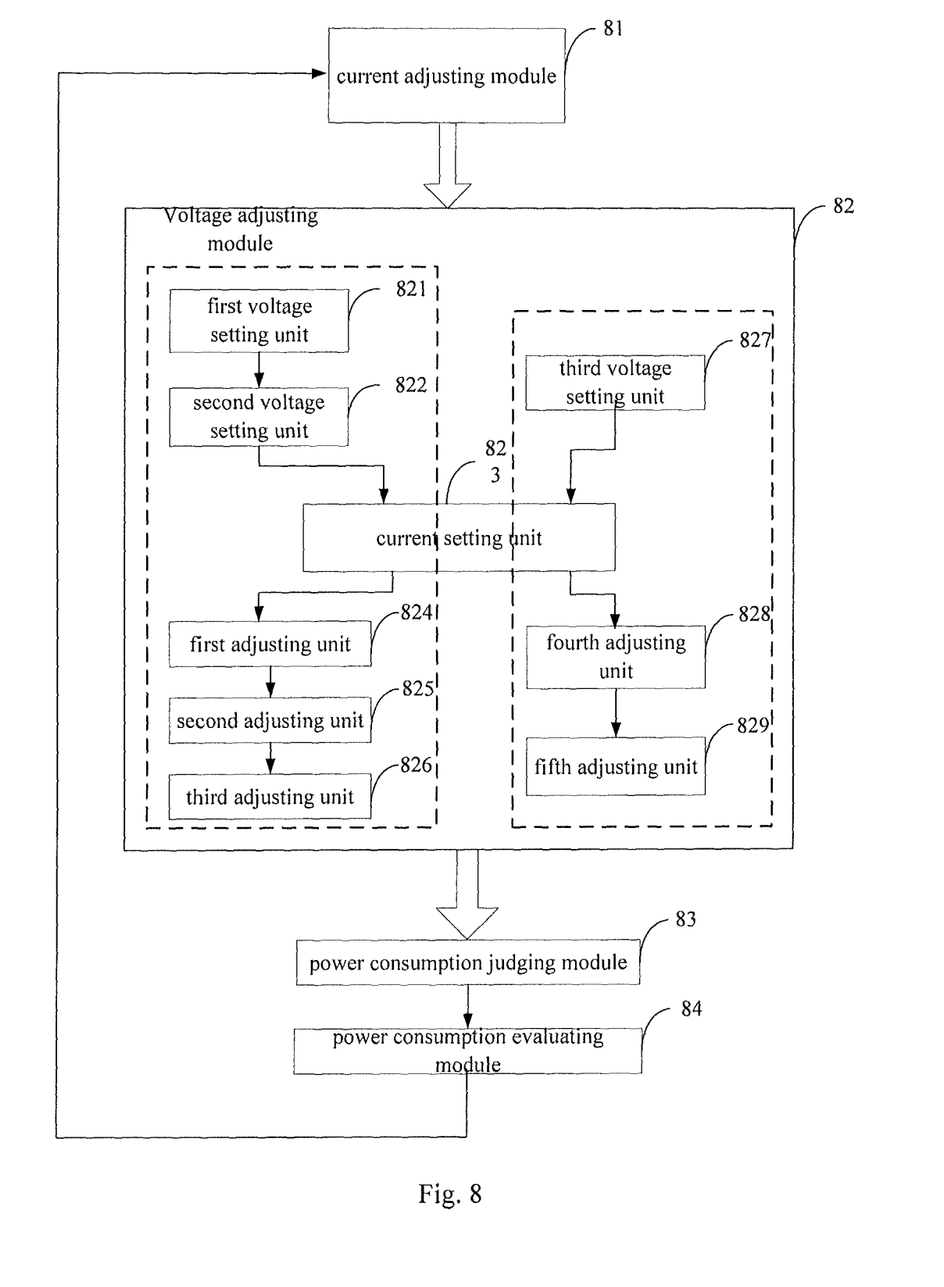
FIG. 8 is a module structural view of a battery charging control system in accordance with an embodiment of the present invention.

FIG. 8 shows structure of a battery charging control system provided in the embodiment of the present invention. For the sake of descriptions, only the parts relevant to the example of the invention are shown. The battery charging control system can be integrated into the portable electronic device, for controlling the charging of the battery.

In a embodiment of the present invention, a current adjusting module 81 is used for adjusting the value of the charging current gradually through the setting of the values of the general register when the connection charging power source is detected. Gradual adjustment of the value of the charging current is to step up or down the immediate charging current. Meanwhile, adjustment of the value of the charging current is to adjust the value of the immediate charging current level by level or by multiple levels at a time, which is dependent on the specific conditions.

A voltage adjusting module 82 is used for detecting the voltage of the charging power source and enabling the voltage to reach the working voltage at the maximum load capacity by stepping up or down the value of the immediate charging current.

In the first embodiment of the present invention, a first voltage setting unit 821 in the voltage adjusting module 82 is used for setting the first lower limit value of the voltage of the charging power source. A second voltage setting unit 822 is used for setting the second lower limit value of the voltage of the charging power source. The first lower limit value is higher than the second lower limit value. A current setting unit 823 is used for setting the upper and lower limit values of the charging current. A first adjusting unit 824 increases the immediate charging current by one level when the voltage of the charging power source exceeds the first lower limit value and the immediate charging current fails to reach the upper limit value of the charging current. A second adjusting unit 825 decreases the immediate charging current by one level when the voltage of the charging power source is lower than the second lower limit value and the immediate charging current fails to reach the lower limit value of the charging current. A third adjusting unit 826 sets the upper limit value of the charging current as the immediate charging current when the voltage of the charging power source is lower than the first lower limit value and higher than the second lower limit value.

In the second embodiment of the invention, a third voltage setting unit 827 in the voltage adjusting module 82 is used for setting the third lower limit value of the voltage of the charging power source. The current setting unit 823 is used for setting the upper and lower limit values of the charging current. A fourth adjusting unit 828 increases the immediate charging current by one level when the voltage of the charging power source exceeds the third lower limit value and the immediate charging current fails to reach the upper limit value of the charging current. A fifth adjusting unit 829 decreases the immediate charging current by one level when the voltage of the charging power source is lower than the third lower limit value and the immediate charging current fails to reach the lower limit value of the charging current. The current setting unit 823 further includes: a first current setting unit for setting the upper limit value of charging current as the maximum capacity of battery, and a second current setting unit for setting the lower limit value of charging current as the current interval between the adjacent charging current levels.

A power consumption determining module 83 judges whether the power consumption in the system is subject to a change after the voltage adjusting module 82 adjusts the voltage of the charging power source to the working voltage at the maximum load capacity. When the power consumption in the system changes, the power consumption evaluating module 84 evaluates the level of power consumption according to the power consumption. The specific methods for evaluation have been described as above. The current adjusting module 81 further adjusts the value of the immediate charging current according to the level of power consumption after the level of power consumption being confirmed.

In the embodiment of the present invention, a plurality of switching tubes and resistances are integrated into the charging current control circuit. The switching tubes is switched on or off by setting the value of the general register, thereby adjusting the existing charging current gradually and causing the voltage of the charging power source to descend/ascend smoothly. This provides a solution to the problem of equipment instability caused by the voltage fluctuation in the adjustment process of charging current in the immediate technology. Meanwhile, in the course of the adjustment of the charging current, the charging power source can provide a working voltage at the maximum load capacity, so that the same portable device can be charged by different charging power sources.

The above-mentioned is only the preferred embodiments of the present invention, but places no limit to the invention. Therefore, any modification, equivalent replacement and improvement etc on the basis of the spirit and principle of invention shall be within the protective scope of the present invention.

What is claimed is:

1. A battery charging device, comprising:
   a charging circuit having a charging current setting terminal for charging a battery according to a value of charging current on the charging current setting terminal;
   a charging current control circuit connected with the charging current setting terminal for adjusting the value of charging current gradually according to a value of equivalent resistance of the charging current control circuit;
   a general register circuit connected with the charging current control circuit for adjusting the value of equivalent resistance by setting value of general registers.

2. The battery charging device of claim 1, wherein the charging current control circuit comprises:

a switching circuit connected with the charging current setting terminal of the charging circuit for controlling switching of the charging circuit;

a current adjusting circuit connected with the switching circuit, for gradually adjusting the value of charging current of the charging circuit.

3. The battery charging device of claim 2, wherein the switching circuit comprising:

a first resistance, and;

a first switching tube wherein a first terminal of the first switching tube is connected to the charging current setting terminal; a second terminal of the first switching tube is grounded via a first resistance; a control terminal of the first switching tube is connected with a portable device and adapted to controlling switching of the charging circuit; the first terminal is a source electrode or a drain electrode; the second terminal is a source electrode or a drain electrode; when the first terminal is the source electrode, the second terminal is the drain electrode; when the second terminal is the source electrode, the first terminal is the drain electrode.

4. The battery charging device of claim 2, wherein the current adjusting circuit comprising at least two cascade-connected resistance control circuit, wherein the resistance control circuit comprising:

a second resistance, and a second switching tube wherein a first terminal of the second switching tube is connected with the switching circuit via the second resistance; a second terminal of the second switching tube is grounded, a control terminal of the second switching tube is connected with an interface terminal of the general register circuit; the first terminal is a source electrode or a drain electrode; the second terminal is a source electrode or a drain electrode; when the first terminal is the source electrode, the second terminal is the drain electrode; when the first terminal is the drain electrode, the second terminal is the source electrode.

5. A method for controlling charging of battery, which is adapted for the battery charging device of claim 1, wherein the method comprising:

adjusting gradually a value of charging current by setting value of a general register when connection of a charging power source is detected.

6. The method of claim 5, wherein the gradually adjusting of the charging current is:

increasing or decreasing a value of immediate charging current by setting the value of the general register.

7. The method of claim 6, wherein the method further comprising the steps of:

detecting voltage of the charging power source, and rendering the voltage of the charging power source to reach a working voltage at a maximum load by gradually increasing or decreasing the value of the immediate charging current.

8. The method of claim 7, wherein the steps of detecting the voltage of the charging power source and rendering the voltage to reach the working voltage at the maximum load by gradually adjusting the value of the charging current are:

setting a first lower limit value of the voltage of the charging power source;

setting a second lower limit value of the voltage of the charging power source, which is less than the first lower limit value;

setting an upper limit value and a lower limit value of the charging current;

increasing the immediate charging current by one level by setting the value of the general register when the voltage of the charging power source is higher than the first lower limit value and the immediate charging current fails to reach the upper limit value of the charging current;

decreasing the immediate charging current by one level by setting the value of the general register when the voltage of the charging power source is lower than the second lower limit value and the immediate charging current fails to reach the lower limit value of the charging current;

setting the upper limit value of the charging current as the immediate charging current by setting the value of the general register when the voltage of the charging power source is lower than the first lower limit value and higher than the second lower limit value.

9. The method of claim 7, wherein the steps of detecting the voltage of the charging power source and enabling the voltage to reach the working voltage at the maximum load by gradually increasing or decreasing the value of the immediate charging current are:

setting a third lower limit value of the voltage of the charging power source;

setting an upper limit value and a lower limit value of the charging current;

increasing the immediate charging current by one level by setting the values of the general register when the voltage of the charging power source is higher than the third lower limit value and the immediate charging current fails to reach the upper limit value of the charging current;

decreasing the immediate charging current by one level by setting the values of the general register when the voltage of the charging power source is lower than the third lower limit value and the immediate charging current fails to reach the lower limit value of the charging current.

10. The method of claim 8, wherein the steps of setting the upper and lower limit values of the charging current are:

setting the upper limit value of the charging current as a maximum capacity of battery;

setting the lower limit value of the charging current as a current interval between the adjacent charging current levels.

11. The method as claim 7, wherein the method further comprising the steps of:

determining whether the power consumption of system is subject to a change;

evaluating grade of power consumption according to the power consumption when the power consumption of system changes;

increasing or decreasing the immediate charging current according to the grade of power consumption.

12. The method as claim 11, wherein the steps of increasing or decreasing the immediate charging current according to the grade of power consumption are:

decreasing the immediate charging current by n levels when the grade of power consumption ascends by n levels;

increasing the immediate charging current by n levels when the grade of power consumption descends by n levels;

n is an integral number equal to or more than 1.

13. A battery charging control system comprising:
a current adjusting module for gradually adjusting a value of the charging current by setting value of a general register when connection of a charging power source is detected.

14. The system of claim 13, wherein the system further comprising:
a voltage adjusting module for detecting the voltage of the charging power source and rendering voltage of the charging power source to reach the working voltage at the maximum capacity by gradually adjusting the value of the immediate charging current.

15. The system of claim 14, wherein the voltage adjusting module further comprising:
a first voltage setting unit for setting a first lower limit value of the voltage of the charging power source;
a second voltage setting unit for setting a second lower limit value of the voltage of the charging power source which is less than the first lower limit value;
a current setting unit for setting an upper limit value and a lower limit value of the charging current;
a first adjusting unit for increasing the immediate charging current by one level according to the value of the general register when the voltage of the charging power source is higher than the first lower limit value and the immediate charging current fails to reach the upper limit value of the charging current;
a second adjusting unit for decreasing the immediate charging current by one level according to the value of the general register when the voltage of the charging power source is lower than the second lower limit value and the immediate charging current fails to reach the lower limit value of the charging current;
a third adjusting unit for setting the upper limit value of the charging current as the immediate charging current according to the value of the general register when the voltage of the charging power source is lower than the first lower limit value and higher than the second lower limit value.

16. The system of claim 14, wherein the voltage adjusting module further comprising:
a third voltage setting unit for setting a third lower limit value for the voltage of the charging power source;
a current setting unit for setting the upper and lower limit values of the charging current;
a fourth adjusting unit for increasing the immediate charging current by one level according to the values of the general register when the voltage of the charging power source is higher than the third lower limit value and the immediate charging current fails to reach the upper limit value of the charging current;
a fifth adjusting unit for decreasing the immediate charging current by one level in accordance with the value of the general register when the voltage of the charging power source is lower than the third lower limit value and the immediate charging current fails to reach the lower limit value of the charging current.

17. The system of claim 15, wherein the current setting unit comprising:
a first current setting unit for setting the upper limit value of the charging current as the maximum capacity of battery by setting the values of the general register;
a second current setting unit for setting the lower limit value of the charging current as the current interval between the adjacent charging current levels by setting the values of the general register.

18. The system of claim 14, wherein the system further comprising:
a power consumption determining module for determining whether the power consumption in the system is subject to a change;
a power consumption evaluating module for evaluating grade of power consumption according to the power consumption when the power consumption determining module confirms that the power consumption in the system changes.

19. The method of claim 9, wherein the steps of setting the upper and lower limit values of the charging current are:
setting the upper limit value of the charging current as a maximum capacity of battery;
setting the lower limit value of the charging current as a current interval between the adjacent charging current levels.

20. The system of claim 16, wherein the current setting unit comprising:
a first current setting unit for setting the upper limit value of the charging current as the maximum capacity of battery by setting the values of the general register;
a second current setting unit for setting the lower limit value of the charging current as the current interval between the adjacent charging current levels by setting the values of the general register.

* * * * *